US009819388B2

(12) United States Patent
Flowers et al.

(10) Patent No.: US 9,819,388 B2
(45) Date of Patent: Nov. 14, 2017

(54) DSL NOISE CANCELLATION

(76) Inventors: Mark B. Flowers, Los Gatos, CA (US);
Mark Mallory, Mukilteo, WA (US);
Mark Brady, Stanford, CA (US); John M. Cioffi, Atherton, CA (US); Mehdi Mohseni, San Mateo, CA (US)

( * ) Notice: Subject to any disclaimer, the term of this patent is extended or adjusted under 35 U.S.C. 154(b) by 349 days.

(21) Appl. No.: 13/254,454

(22) PCT Filed: Mar. 4, 2009

(86) PCT No.: PCT/US2009/036076
§ 371 (c)(1),
(2), (4) Date: Nov. 9, 2011

(87) PCT Pub. No.: WO2010/101568
PCT Pub. Date: Sep. 10, 2010

(65) Prior Publication Data
US 2012/0051410 A1    Mar. 1, 2012

(51) Int. Cl.
*H04L 25/08* (2006.01)
*H04B 3/32* (2006.01)
(Continued)

(52) U.S. Cl.
CPC ............ *H04B 3/32* (2013.01); *H04B 1/7107* (2013.01); *H04J 11/004* (2013.01); *H04L 27/2647* (2013.01); *H04N 7/102* (2013.01)

(58) Field of Classification Search
CPC ..... H04B 3/32; H04B 1/7107; H04L 27/2647; H04J 11/004; H04N 7/102
See application file for complete search history.

(56) References Cited

U.S. PATENT DOCUMENTS 5,887,032 A * 3/1999 Cioffi ............................. 375/257
5,995,567 A * 11/1999 Cioffi et al. .................... 375/346
(Continued)

FOREIGN PATENT DOCUMENTS

EP        1185047       3/2002
WO     WO02/081869    10/2002
(Continued)

OTHER PUBLICATIONS

Magesacher et al. "Adaptive Interference Cancellation Using Common-Mode Information in DSL", EURASIP Journal on Advances in Signal Processing 2007, 2007:084956, Jul. 31, 2007.*
(Continued)

*Primary Examiner* — Ross Varndell
(74) *Attorney, Agent, or Firm* — North Weber & Baugh LLP

(57) ABSTRACT

A method and apparatus in a noise cancellation system that receives a noise reference signal via a noise reference signal input port, and performs at least one of procedures a and b set forth below for reducing noise in a DSL data signal transmitted on a DSL transmission line to which the noise cancellation system is coupled: a.i.) creating a noise free representation of a DSL synchronization symbol repeatedly occurring in the transmitted DSL data signal, and a.ii.) reducing the noise in the transmitted DSL data signal based on the noise free representation of the DSL synchronization symbol and the received noise reference signal, and b.i.) analyzing at least one of the received noise reference signal and the transmitted DSL data signal to identify one or more frequency bands in which to de-emphasize noise cancellation in the transmitted DSL data signal, and b.ii.) causing the noise cancellation system to de-emphasize noise cancellation in the identified one or more frequency bands of the transmitted DSL data signal, responsive to the analysis.

35 Claims, 9 Drawing Sheets

(51) Int. Cl.
  *H04B 1/7107* (2011.01)
  *H04N 7/10* (2006.01)
  *H04J 11/00* (2006.01)
  *H04L 27/26* (2006.01)

(56) References Cited

U.S. PATENT DOCUMENTS

| | | | | |
|---|---|---|---|---|
| 6,628,754 | B1* | 9/2003 | Murphy et al. | 379/1.03 |
| 6,668,023 | B1* | 12/2003 | Betts | 375/285 |
| 6,999,504 | B1* | 2/2006 | Amrany et al. | 375/222 |
| 7,315,592 | B2* | 1/2008 | Tsatsanis et al. | 375/346 |
| 2003/0108095 | A1* | 6/2003 | Duvaut et al. | 375/222 |
| 2006/0029148 | A1* | 2/2006 | Tsatsanis | 375/267 |
| 2009/0316649 | A1* | 12/2009 | Chen | 370/331 |
| 2010/0046684 | A1* | 2/2010 | De Lind Van Wijngaarden | H04B 3/487 375/363 |
| 2010/0202400 | A1* | 8/2010 | Richardson et al. | 370/330 |
| 2011/0007623 | A1* | 1/2011 | Cendrillon et al. | 370/201 |

FOREIGN PATENT DOCUMENTS

| WO | WO-02081869 | 10/2002 |
|---|---|---|
| WO | WO-03081869 | 10/2003 |

OTHER PUBLICATIONS

Patent Cooperation Treaty, International Search Report for International Patent Application No. PCT/US2009/036076, (dated Sep. 7, 2009) 2 pages.
IPRP: International Preliminary Report on Patentability from PCT/US2009/036076 dated Sep. 15, 2011, whole document.
Non-Final Office Action for European Patent Application No. 09789495.0, dated Jun. 29, 2012, whole document.
Non-Final Office Action for European Patent Application No. 09789495.0, dated Jan. 23, 2013, whole document.
Decision of Grant for Japanese Patent Application No. 2011-552918, dated Feb. 7, 2013, whole document.
Non-Final Office Action for Chinese Patent Application No. 200980158547.1, dated Jul. 3, 2013, whole document.
Non-Final Office Action for Chinese Patent Application No. 200980158547.1, dated Mar. 25, 2014, whole document.
Patent Cooperation Treaty, International Search Report and Written Opinion for International Patent Application No. PCT/US2009/036076, dated Jul. 9, 2009, whole document.
Notice of Allowance for Chinese Patent Application No. 200980158547.1, dated Oct. 9, 2014.
First Examination Report for Australian Patent Application No. 2009341558, dated Feb. 9, 2015.

* cited by examiner

DSL NOISE CANCELLATION

CROSS REFERENCE TO RELATED APPLICATIONS

This application is a U.S. National Phase application under 35 U.S.C. §371 of International Application No, PCT/US2009/036076, filed Mar. 4, 2009, entitled DSL NOISE CANCELLATION.

BACKGROUND OF THE INVENTION

Field of the Invention

An embodiment of the invention relates to the field of DSL (Digital Subscriber Line) communications, and in particular, to the use of noise reference signals to reduce noise interference on DSL transmission lines.

Description of Related Art

DSL deployment began in the mid 1990s. There are now over 300 million DSL transmission lines (or simply "DSL lines") worldwide. DSL is designed to provide high bit rate data communication by utilizing high frequency signals on unshielded telephone lines. The telephone lines were originally designed for voice communications, not high frequency data transmissions, and are inherently susceptible to noise interference (or simply, "noise") in the high frequency bands used by DSL.

Noise interference on DSL transmission lines (that is, on unshielded telephone lines carrying DSL data traffic) is responsible for significant performance degradation in DSL deployments throughout the world. It is not uncommon for the majority of the lines in a typical DSL network to suffer significant data rate loss as a result of noise interference. In most DSL networks there are many lines that suffer well over a 50% loss in data rates as a result of noise. Numerous noise sources impair DSL transmission including AM radio transmissions, impulse noise from a variety of sources, harmonic noise from computers and televisions, interference from other digital communications protocols such as T1, and crosstalk from other DSL transmission lines.

As early as the mid 1990s DSL designers have recognized the negative effects of noise interference and have sought to mitigate the resulting performance degradation. U.S. Pat. No. 5,995,567 entitled 'Radio Frequency Noise Cancellation', issued in 1997 describes the use of a noise reference signal and the well known LMS (Least Mean Square) cancellation technique to reduce noise interference on the DSL transmission line.

Over the years numerous attempts have been made to utilize noise reference signals to reduce noise on DSL lines and thereby improve DSL data transmission performance (higher bit rate, longer transmission range and/or fewer transmission errors). Commonly available noise reference signal sources include the common mode signal on a DSL line and signals derived from other telephone lines in the vicinity of the DSL line. These line-derived (and other similar) noise reference signals have two sub-optimal characteristics that might result in poor noise cancellation performance.

First, telephone line derived noise reference signals could contain some residual DSL data signal energy as a result of telephone line crosstalk. Noise cancellers work to minimize correlated energy on the DSL line and as a result will often work to 'cancel' the DSL data signal thereby degrading DSL modem performance. Hereafter, this effect is referred to as "data signal cancellation".

Second, these noise reference signal sources often have a complex combination of many noise signals. Various noise sources will in general couple into the noise reference signal and the DSL data line differently. For example, some noises that are not present on the DSL line may couple into the noise reference signal. In such cases a conventional cancellation approach (such as LMS) that simply works to reduce the overall broadband noise energy may achieve poor results in terms of achieving any DSL transmission performance improvement. For example, an LMS canceller may focus on a large energy narrowband AM noise, achieving modest bit rate enhancement at the AM frequency band, while generating greater noise deterioration in other bands. In general, broadband energy-reducing algorithms do not have the ability to optimize the frequency band cancellation focus in areas that would result in optimal DSL data transmission performance enhancement.

Various solutions have been proposed to overcome the problems that result from noise reference signals of this nature. Each of the proposed solutions has certain limitations and deployment issues.

Several of the proposed solutions involve techniques that utilize commonly available telephone line derived noise reference signal sources. Use of such readily available noise sources is preferred in order to facilitate wide deployment.

None of these techniques, however, has provided an effective method for mitigating the detrimental DSL data signal cancellation effect that results from the residual DSL data signal often found in telephone line derived noise reference signal sources. Cioffi et al., in U.S. Pat. No. 5,995,567, describe training the noise canceller only during periods of no DSL data transmission in order to resolve this problem. This technique is proposed for use in ping-pong time duplex Asynchronous DSL (ADSL) systems, which have very low applicability in the current world wide deployment, since commonly used Frequency Division Duplex (FDD) and echo-cancelled DSL technologies do not have repeating silent periods as required by U.S. Pat. No. 5,995,567. Magesacher, "Analysis of Adaptive Interference Cancellation Using Common-Mode Information in Wireline Communications" further describes the problem of DSL data signal cancellation and concludes that noise cancellers using a common mode line derived noise reference signal deteriorate DSL performance when adapting during data transmission (and hence are not readily applicable to commonly deployed DSL technology).

Amrany et al., U.S. Pat. No. 6,999,504, describe the use of the DSL line common mode signal as a noise reference signal. While use of this signal is desirable due to its availability on all DSL connections, Amrany do not address the problems of data signal cancellation or non-optimal frequency band focus. In practice, these problems limit the use of a common mode signal as a noise reference signal to achieve DSL transmission line performance improvement when used with conventional cancellation techniques.

Other approaches describe techniques that improve the ability of a noise canceller to handle the many types of noise found in line derived noise reference signal sources (such as multiple sources of AM, impulse, harmonic, and/or crosstalk, noise). Cioffi et al. in PCT published patent application, publication number WO 2008/045332, propose analysis of the noise reference signal and adjustment of cancellation parameters based on the class of noise present. Techniques described therein include storing sets of coefficients, applying cancellation thresholds, and incorporating demodulation feedback. These approaches assist a noise canceller in optimizing cancellation for the class of noise present, but do not directly address the issue of data signal cancellation as a result of a residual DSL data signal in the noise reference signal.

Other techniques, set forth below, propose the use of a more optimal noise reference signal source. Approaches of this nature have limited applicability due to the limited amount of noise that can be cancelled from the proposed reference signal sources and/or the limited availability of the proposed reference signal sources.

Fischer, et al., in U.S. Pat. No. 7,003,094, describe using an AM radio receiver to generate a suitable AM noise reference signal that would not be subject to the problems associated with line derived noise reference signal sources. This approach is effective for the cancellation of noise from transmissions of one or more AM radio stations. However, the use of AM receivers as noise reference signal sources does not provide a large improvement to the aggregate performance of a DSL network because AM transmission noise may not be one of the larger noise impairment sources.

Bingel, et al. in U.S. Pat. No. 6,477,212, describes a noise reference signal derived from a separate detection device such as an antenna. In practice, a detector will not generate a well correlated noise reference signal if it is decoupled from the line signals to the extent that the problems associated with line derived noise references are not present. Crosstalk and much of the line coupled impulse and harmonic noise will not be well represented in a line isolated detector. Approaches of this type are primarily suited to cancellation of AM and amateur radio broadcast signals. Improvement in only these types of noise has limited aggregate benefit to a DSL network.

Vectored DSL noise cancellation is an approach that provides effective cancellation of multiple DSL crosstalk sources by providing a cancellation device with an ideal reference signal from other DSL transmitters that are likely to have a crosstalk effect. While this is an effective method to reduce DSL crosstalk interference, it is only applicable to new systems with heavily modified architectures that support sharing transmit signal sources between DSL Access Multiplexor (DSLAM) modems. Furthermore, vectored DSL does not address cancellation of other external noise sources such as AM radio transmission or impulse noise at the Customer Premises Equipment (CPE) end of the DSL connection.

Shah et al. in Patent Cooperation Treaty (PCT) application, publication number WO 2004/027579, describe the use of multiple receivers with interconnection such that received data signals from one line can be used to cancel crosstalk on another line. This approach requires an interconnection path from multiple receivers and is therefore not applicable to the majority of DSL network installations.

A significant advancement in the art would be accomplished by an embodiment of an invention that could overcome the problems resulting from a residual DSL data signal present in a noise reference signal and/or that could optimize the frequency band cancellation focus of a noise canceller such that readily available line derived noise reference signals could be used to improve the aggregate performance of a DSL network.

SUMMARY

An embodiment of the invention enables the use of readily available telephone line derived noise reference signals (or other similar noise reference signals) for the cancellation of DSL noise impairments such that the aggregate performance of a DSL network is beneficially improved. By utilizing line derived noise references, an embodiment of the invention is able to sense and cancel the multiple noise types present on DSL lines and is well-suited to wide deployment, including as a retrofit upgrade for the over 300 million DSL lines in existence today.

In particular, one embodiment of the invention facilitates the beneficial use of line derived (or other similar) noise references by:

a) mitigating the detrimental data signal cancellation that results when a residual DSL data signal is present in a noise reference signal, thereby enabling i) the noise cancellation to improve DSL data transmission performance and ii) the cancellation coefficients to adapt during data transmission;

and b) shifting the frequency band cancellation focus of a cancellation process away from the overall energy reduction goals of a conventional canceller (such as an LMS approach) to a frequency band cancellation focus that is optimized for greater DSL performance enhancement.

These functions can be used individually or in combination to achieve beneficial use of line derived noise reference signals.

One embodiment of the invention utilizes one or more of three techniques to overcome the detrimental data signal cancellation that results when residual DSL data signal energy is present in a noise reference signal. Each of the techniques exploits the repetitive nature of the DSL synchronization symbol to avoid, mitigate, or deemphasize, the undesired data signal cancellation. These techniques may be used individually or in any combination.

The initial step in the process is to acquire and store a noise-free representation of the DSL synchronization symbol, or simply, synch symbol. Sync symbols are a feature of most widely-deployed DSL line transmission standards. The first technique uses the noise-free stored synch symbol to train a noise reference 'clean-up' energy cancellation loop that removes much of the residual DSL data signal from the noise reference signal. This technique mitigates or eliminates data signal cancellation problems.

The second technique uses the noise-free stored synch symbol to create repetitive periods of simulated data transmission silence. These periods are created during synch symbol transmission by subtracting the stored sync symbol from the actual DSL line synch symbol transmission signal. When utilizing this technique a primary DSL noise cancellation loop is updated only during the periods of simulated data silence, thereby avoiding data cancellation that would result from a residual DSL data signal that may remain in the noise reference signal. Cancellation coefficients are thus learned during the synch symbol periods and then available to achieve noise cancellation during subsequent data symbol periods. The coefficients, which represent the spatial coupling of noise reference signal sources onto the DSL line, are valid during the subsequent data symbol periods because spatial coupling is relatively time invariant. Minor changes in the cancellation coefficients can be tracked by an update process during the repetitive synch symbol periods.

The third technique involves avoidance or de-emphasis of attempted noise cancellation in frequency bands in which correlation is detected between the noise reference signal and the DSL data signal. Correlation between the noise reference signal and the noise-free stored synch symbol is measured during periods of synch symbol transmission. This analysis identifies frequency bands in which a correlated DSL data signal is present in the noise reference signal. This third technique works in conjunction with a frequency band agile noise cancellation process that can be guided to avoid or deemphasize a cancellation attempt in the bands in which correlation has been detected. Frequency bands in which the noise reference signal can be helpful are exploited whereas detrimental frequency bands are avoided or deemphasized.

Another technique to overcome the detrimental data signal cancellation that results when residual DSL data signal energy is present in a noise reference involves the use of memory and averaging or predicting processes. This approach is useful when noise reference signals of interest are periodic in nature, such as noise generated by 60 Hz harmonics, television sets, computer displays, power supplies or electric motors. By analyzing or averaging a multiplicity of signal samples over time, each of which is periodic with a noise signal of interest, the detrimental DSL data signal can be suppressed. It will be noted that this technique is also useful for extracting periodic noise reference signals of interest from other forms of unwanted signal energy.

An embodiment of the invention further facilitates the use of line derived noise reference signals by shifting the frequency band cancellation focus away from the overall energy reduction goals of a conventional canceller (such as an LMS approach) to an alternate frequency band cancellation focus that has been optimized for greater DSL performance enhancement.

The first step in the frequency band cancellation focus optimization process is to analyze the DSL line signal and the noise reference signal in order to determine frequency bands a) in which noise cancellation will be most beneficial to DSL performance enhancement, b) in which cancellation attempts will be detrimental and should be avoided, and c) that will have negligible effect on the DSL line signal The second step in the process is to provide frequency band guidance information to a frequency band agile noise canceller. The frequency band agile canceller can be implemented by any of a number of techniques including Fast Fourier Transform (FFT) analysis of the signals and frequency domain adaptation coefficients.

Signal and noise analysis can involve any number of techniques used in combination to determine optimal frequency band guidance. The DSL line signal can be evaluated to determine bands of use and bands of potential use. From this, the cancellation process can be guided to de-emphasize bands not likely to be used by the DSL signal on each line.

The noise reference signal can be evaluated to determine noise types and noise energy PSD (Power Spectral Density). The stored noise-free synch symbol can be used to create periods of simulated data transmission silence in which the DSL line noise floor can be measured. Noise reference information can be combined with noise floor estimates to determine bandwidths in which noise cancellation is most likely to benefit DSL performance. For example, an analysis of this nature may determine that there would be large benefits from cancelling an AM radio transmission signal if the DSL modem would be impaired by the AM radio transmission signal plus its FFT side-lobes, or the analysis may determine that focusing cancellation on broadband noise in other bands may provide greater benefit to DSL performance than cancelling the AM radio transmission signal.

Correlation techniques can be used to further enhance the analysis and identification of optimal frequency band cancellation focus. The noise reference signal can be correlated with the actual DSL data line signal and/or with the line signal during periods of simulated data transmission silence. Combining this information with synch symbol correlation data can help identify energy on the noise reference signal that is a) correlated to the DSL data signal, b) correlated to line noise on the DSL line, and/or c) not correlated to either. This information can be used to further guide a frequency band agile canceller toward focus on frequency bands most beneficial to DSL performance.

In addition to guidance from local signal analysis, a centralized network performance management system may provide input and guidance to the frequency band agile canceller. A network aware process can track additional beneficial information such as user perceived gain versus type of cancellation attempted, time of day noise activity, or time of day performance needs.

The frequency band guidance provided by the processes described above may result in considerable alteration of the noise cancellation coefficients relative to those that would result from a conventional cancellation technique with the goal of reducing the aggregate noise power. The altered cancellation coefficients result in enhanced DSL modem performance. In addition, the frequency band cancellation focus optimization process can be adaptive such that the noise cancellation guidance tracks changing line and noise conditions.

The data cancellation avoidance functions and the frequency band cancellation optimization focus function may be utilized independently or in combination depending on the functional goals of a particular embodiment.

While the techniques above are described as beneficial when using line derived noise reference signals, it will be noted that an embodiment of the invention beneficially applies to any noise reference signal containing residual DSL data information, and to any noise reference signal containing complex signals such that DSL performance would benefit from frequency band cancellation focus optimization other than aggregate noise reduction goals.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION OF THE INVENTION

Figure 1:
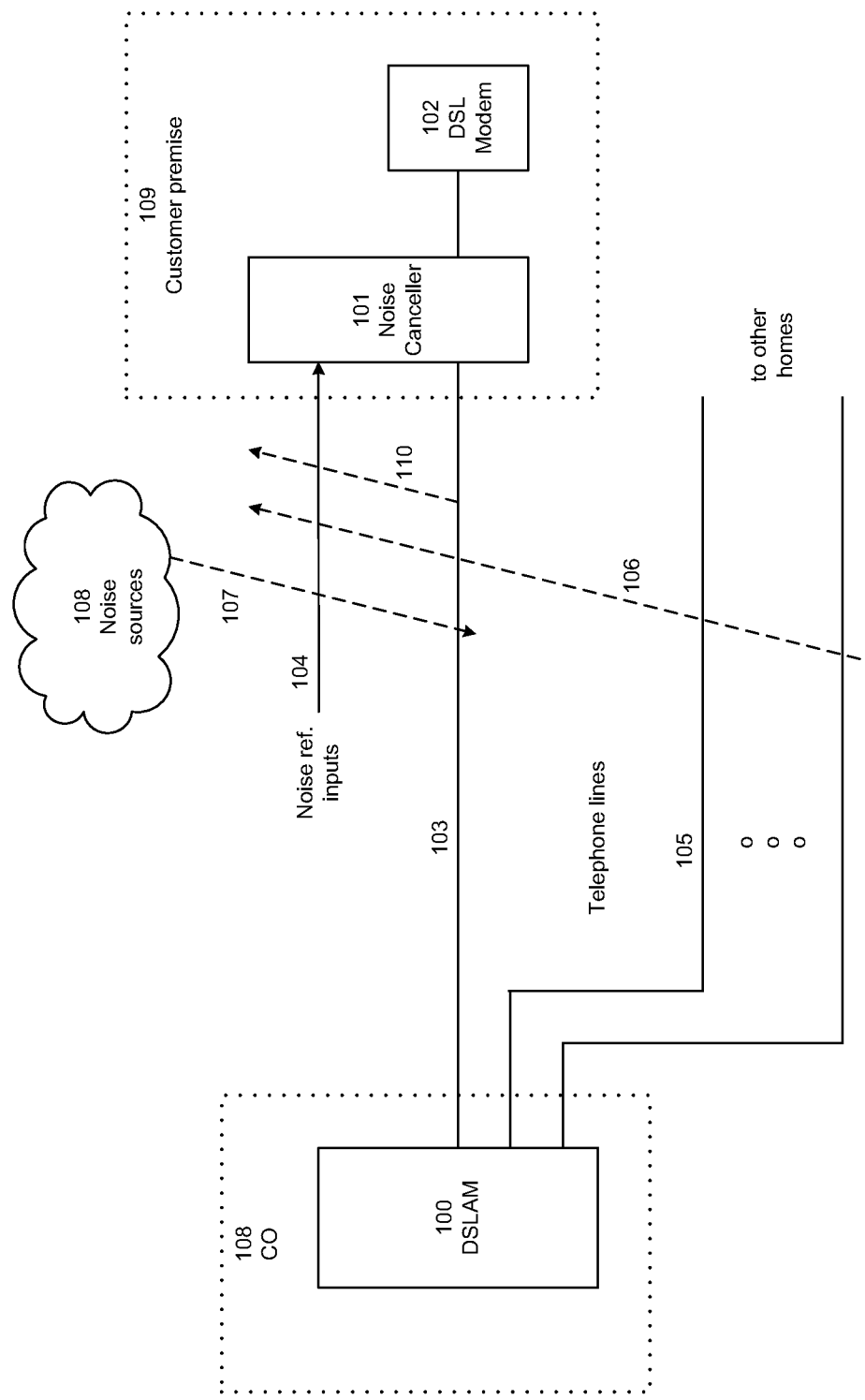
FIG. 1 illustrates a DSL network in which an embodiment of the invention may be implemented.

FIG. 1 illustrates a DSL network involving one embodiment of the invention. A bank of DSL modems, referred to as a DSLAM, (100) is typically located within a Central Office (108). Additionally, receiving DSL modems are each located at a Customer Premise (109). Telephone line (103) carries the DSL signal from the DSLAM to the modem. Line (103) may optionally provide voice band telephone signaling as well. Telephone line 103 typically comprises a twisted wire pair; such twisted wire pair may be one of a number of twisted wire pairs, in combination or separated, within a common binder of wires terminating on the location of the noise canceller 101. Additional telephone lines (105) provide DSL communication to other customers.

Noise canceller (101) represents one embodiment of the invention that is located within the customer premises. Noise canceller (101) utilizes noise reference signals found on noise reference inputs (104) to reduce the interference noise on line (103) and thereby enhance the DSL performance of attached modem (102). Location of noise canceller (101) within the customer premise enhances its ability to cancel interfering noise at the modem input. Other embodiments of the invention include integration of canceller (101) into a modem, or integration into devices located outside of the customer premise. Embodiments of the invention that are physically separate from the modem will facilitate deployment in buildings where noise reference signals are not readily available at the modem location (for example, installations that involve modulation of the DSL signal onto a coax cable prior to termination at the modem).

Noise reference signals (104) represent one or more inputs that the canceller (101) uses as inputs for the noise cancellation process. Noise reference signals can be derived from common mode or differential mode signals on the associated line (103) and from any other telephone line in the local vicinity, for example, any of the wires of any twisted pairs, in combination or separated, within the common binder of wires terminating on the location of the canceller, regardless of whether that line has DSL signaling or voice band signaling present. Alternate sources of noise reference signals include antennas and building ground reference connections. It is beneficial for a DSL noise cancellation device to utilize noise reference signals derived from telephone line signals because one or more telephone lines are readily available at DSL installations, and because telephone lines often contain a representation of the noise to be cancelled. However, the complex nature of noise signals present on telephone line derived noise reference signal sources often causes conventional noise cancellation algorithms to degrade DSL performance. One embodiment of the invention includes techniques that enable the use of line derived noise reference signal sources with complex noise signals for the beneficial reduction of noise and improvement of DSL performance.

DSL coupling signal (110) illustrates that a portion of the DSL data signal associated with the attached modem may be coupled into noise reference signals (104). Typically the presence of a residual DSL data signal in a noise reference signal, via path (110), will cause canceller (101) to cancel the DSL data signal and thereby degrade DSL performance. One embodiment of the invention includes techniques that mitigate or eliminate DSL data cancellation by canceller (101) such that noise reference signals (104) with residual DSL data signal components can be used to beneficially reduce DSL line noise and enhance the performance of the attached DSL modem (102).

Crosstalk signals (106) couple data signal crosstalk interference from other data transmission lines (105) onto both telephone line (103) and noise reference inputs (104). Crosstalk interferers may be other DSL transmitters or other data communication protocols such as T1 or ISDN. Noise interference signals (107) represent multiple noise signals from multiple sources that couple onto both telephone line (103) and noise reference inputs (104). Commonly found noise interference signals include AM broadcast, harmonic signals from TVs and computers, and broadband impulse interference from a variety of appliances and other electronic or electro-mechanical devices. Note that noise sources are present both external and internal to the customer premise (109).

Noise reference signals (104), having a representation of multiple interfering noise signals, can be used by canceller (101) to reduce the interference from multiple noise sources and thereby enhance the DSL performance of attached modem (102). However, conventional cancellation techniques, such as LMS, which work to reduce the aggregate noise power on line (103), may not provide optimal enhancement of DSL performance. An embodiment of the invention includes techniques that analyze the noise reference signals and line signals and, from that analysis, provide frequency band guidance to canceller (101) such that a more optimal frequency band cancellation focus is accomplished thereby achieving greater enhancement of DSL performance.

Figure 2:
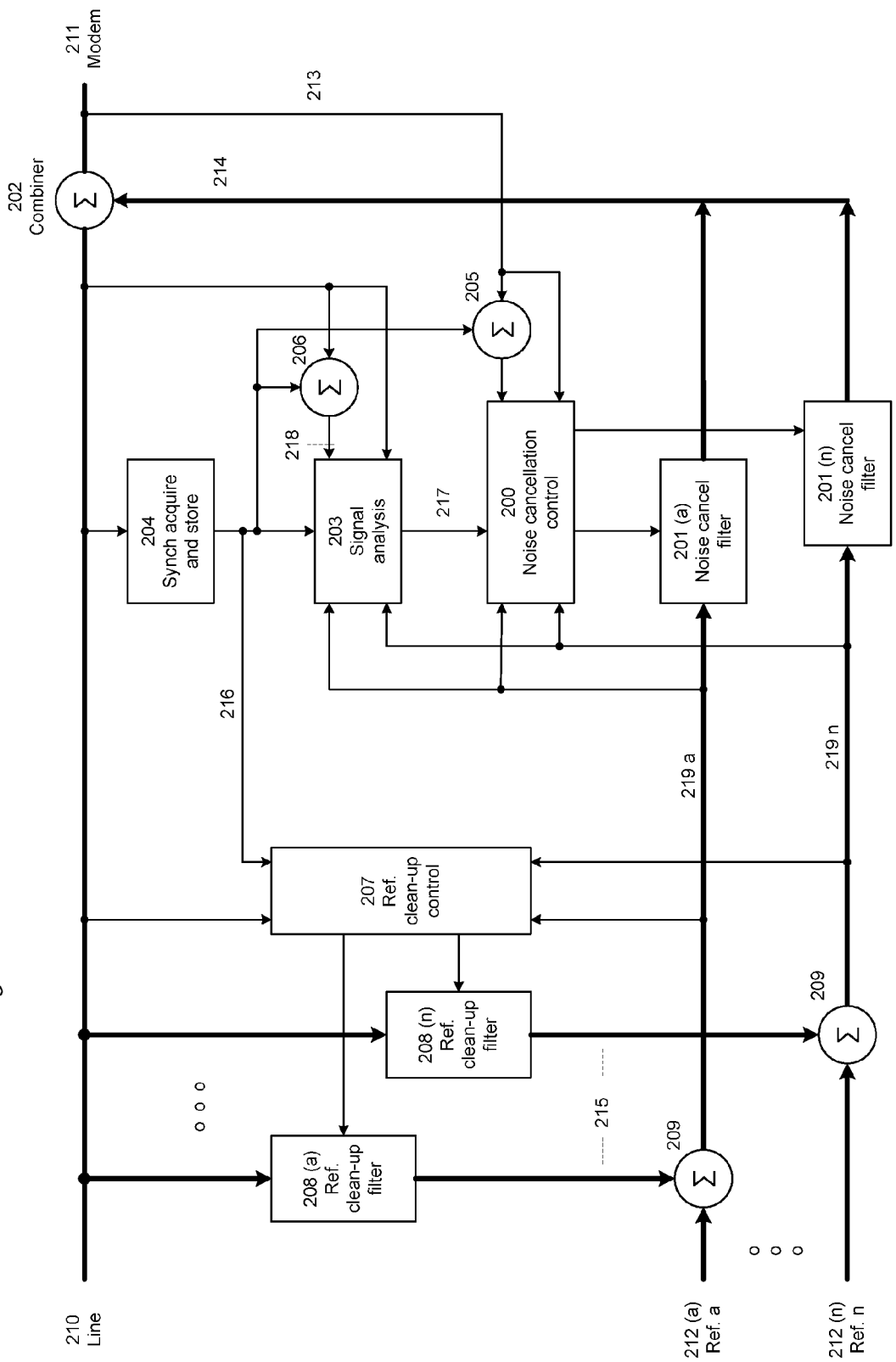
FIG. 2 illustrates at least one embodiment of the invention.

FIG. 2 illustrates a block diagram of one embodiment of the invention. The figure depicts the various functional aspects of the invention in separate logic blocks. In one embodiment, one or more of the logic blocks may be implemented in hardware. Alternatively, one or more of the logic blocks may be implemented in firmware. For example, it is contemplated an embodiment of the invention may be implemented by way of a firmware upgrade, for example, to a modem. Line port (210) provides for a telephone line connection to a DSL DSLAM (100), modem port (211) provides for a connection to an associated DSL modem in the customer premise, and noise reference ports (212a-n) provide for input of one or more noise reference signals.

Adaptive noise cancelling filters (201a-n) extract from respective noise reference signals (212) a noise cancellation signal (214) that contains inverse images of noise present on the DSL line at port (210). Combiner (202) combines noise cancellation signal (214) with the DSL line signal such that the resulting signal presented to the associated customer premises modem via modem port (211) has reduced noise interference and supports enhanced DSL performance.

Adaptive noise cancellation filters (201) have programmable coefficients and, as such, are implemented using digital filtering techniques according to one embodiment of the invention. Those skilled in the art will recognize that these filters and associated functions may be configured to process time domain or frequency domain signals, and that such processing may be implemented with digital logic or microprocessors and software. In one embodiment adaptive noise cancellation filters (201) are implemented as the parallel combination of a long wide bandwidth FIR filter, 128 points for example, and one or more narrow bandwidth filters that can be guided to process narrow band AM or harmonic signals.

Combiner circuit (202) may be implemented using an analog delay line configured to match the signal processing delay of the noise cancellation process, plus a hybrid circuit such that the noise cancellation signal is presented primarily in the direction of the modem attached to port 211. In one embodiment combiner circuit (202) is implemented using dual hybrid circuits configured to break the telephone line signal into separate upstream and downstream signal paths. In this configuration the noise cancellation signal will be applied to only the downstream signal path. The dual hybrid configuration enables the possible amplification and/or frequency compensation of the downstream signal such that the negative effects of the modem noise floor and/or dynamic range can be reduced. In one embodiment the hybrids are implemented using adaptive hybrid cancellation techniques that beneficially reduce the energy of the upstream signal present in an error signal (213).

Noise cancellation control block (200) adapts the coefficients of noise cancellation filter(s) (201) such that a beneficial reduction in noise is accomplished at combiner (202). The cancellation control function (200) looks for energy correlation between noise reference inputs and error signal (213). In a conventional cancellation algorithm, such as LMS, the cancellation filter coefficients are adapted in order to minimize the energy of noise reference signals that are present on error signal (213) which results in cancellation of correlated noise signal components on the DSL line. One such LMS-based approach is described below. Those skilled in the art of noise cancellation will be familiar with these techniques and implementation approaches, as well as similar LMS and adaptive filtering techniques.

Let $x_n$ denote the signal from the line (210) at discrete time n, $y_n$ denote the signal (213) from the modem (211) at discrete time n, and $r'_n$ denote the cleaned-up Ref. a signal (219) at discrete time n. The filter (201(*a*)) comprises a finite-impulse response (FIR) filter, whose taps are denoted by $w_n$. The noise cancellation control block (200) controls the filter (201(*a*)) taps in a manner prescribed by the Least-Mean Squares (LMS) or Regularized Least Mean Squares (RLMS) algorithms. In this case, the taps of the filter used by the Noise cancel filter (201(*a*)) module may be updated by the noise cancellation control block (200) according to the following LMS/RLMS update equations:

$$w_n \leftarrow w_n + \mu(r'_n \cdot y_n)$$

Or:

$$w_n \leftarrow w_n + \mu\left(\frac{r'_n}{|r'|} \cdot y_n\right)$$

Where μ is a parameter adjusted by the noise cancellation control block (200) and |r| denotes the average power of the signal $r_n$.

In one embodiment of the invention, signal analysis function (203) is used to beneficially direct the frequency band cancellation focus of noise cancellation control block (200). This guidance will shift the frequency band cancellation focus away from that which would have been achieved by a conventional energy minimization approach to an embodiment of the invention that results in better DSL performance. Frequency band guidance information (217) can be in many formats including guidance to avoid or de-emphasize frequency band cancellation in certain frequency bands, guidance to focus cancellation in certain frequency bands, and/or guidance to relax or ignore cancellation results in other frequency bands. Guidance information (217) may contain other parameters such as thresholds, limits and time constants to be associated with cancellation guidance in each of the identified frequency bands.

Embodiments of the invention that include signal analysis function (203) have a frequency band agile noise cancellation control function (200) that is capable of incorporating frequency band guidance information (217) of the type discussed above. LMS algorithms can be modified and adapted to accommodate frequency band cancellation guidance. One embodiment uses Fourier transforms and an adapted frequency domain LMS algorithm in order to facilitate accommodation of frequency band cancellation information. Alternately, time domain cancellation algorithms can be adapted to accommodate frequency band cancellation guidance. An example embodiment is discussed below, while it is noted that those skilled in the art will be familiar with similar enabling techniques.

Let $Y_n$ denote the Fourier transform of the signal (213) from the modem (211) at discrete frequency n, and $R'_n$ denote the Fourier transform of the Ref. a signal (212) at discrete frequency n. The filter (201(*a*)) comprises a finite-impulse response (FIR) filter, whose taps are be denoted by $w_n$. The noise cancellation control block (200) controls the filter (201(*a*)) taps in a manner prescribed by the Least-Mean Squares (LMS) or Regularized Least Mean Squares (RLMS) algorithms. In this case, the taps of the filter used by the "Filter" module may be updated by the noise cancellation control block (200) according to the following equations:

$$w_n \leftarrow w_n + \mathrm{IFFT}[\mu_n(R'_n \cdot Y_n)]$$

Or $$w_n \leftarrow w_n + IFFT\left[\mu_n\left(\frac{R'_n}{|R'|} \cdot Y_n\right)\right]$$

Where $\mu_n$ is a frequency-dependent LMS adaptation parameter adjusted by the "Control Logic", IFFT denotes the inverse fast Fourier transform operation, and |R"| denotes the average power of the signal $R'_n$.

In one embodiment, signal analysis function (203) performs a number of analytic operations to determine beneficial frequency band cancellation guidance information (217) for use by noise cancellation control block (200). Multiple analysis routines combine, each with an importance weighting factor, to generate aggregate frequency band cancellation guidance.

One analysis technique within signal analysis function (203) involves spectral analysis of the DSL signal (210) in order to determine frequency bands in which the associated modem is not likely to receive data. For example, an analysis routine identifies upstream signal frequency bands and high attenuation downstream frequency bands as unusable by the local modem receiver. This information is used to direct the canceller to relax constraints or possibly ignore cancellation results altogether in unusable downstream bands. Providing this information to cancellation control block (200) is beneficial because noise cancellation filters (201) have constraints on realizable transfer functions such that relaxing the requirements in a low importance band will enhance the ability of the filter to meet requirements in a higher importance band.

Another analysis technique within signal analysis function (203) involves analysis of the noise reference signals (212*a-n*) in order to evaluate the type of noises present.

Identifiable noise types include broadband noise, AM noise, harmonic noise and impulse noise. An analysis routine that has an understanding of DSL demodulation can make an assessment as to which types of noises are causing larger DSL impairments. Analysis of the DSL line signal (210) PSD can assist in making this determination. The routine provides frequency band cancellation guidance information (217) to the noise cancellation control block (200) to direct cancellation toward the most beneficial type of noise reduction. Guidance can be adjusted quickly to adapt to changing noise conditions, such as the presence of a noise impulse. It should be noted that guidance derived from attempting to optimize the benefit to a DSL line beneficially modifies the result that would have been obtained from a conventional energy reduction approach. For example, analysis may determine that there would be only a small gain from cancelling a high energy narrow band AM signal, and therefore may direct the canceller instead to cancel a lower energy broadband crosstalk signal that results in greater DSL performance enhancement.

Figure 3:
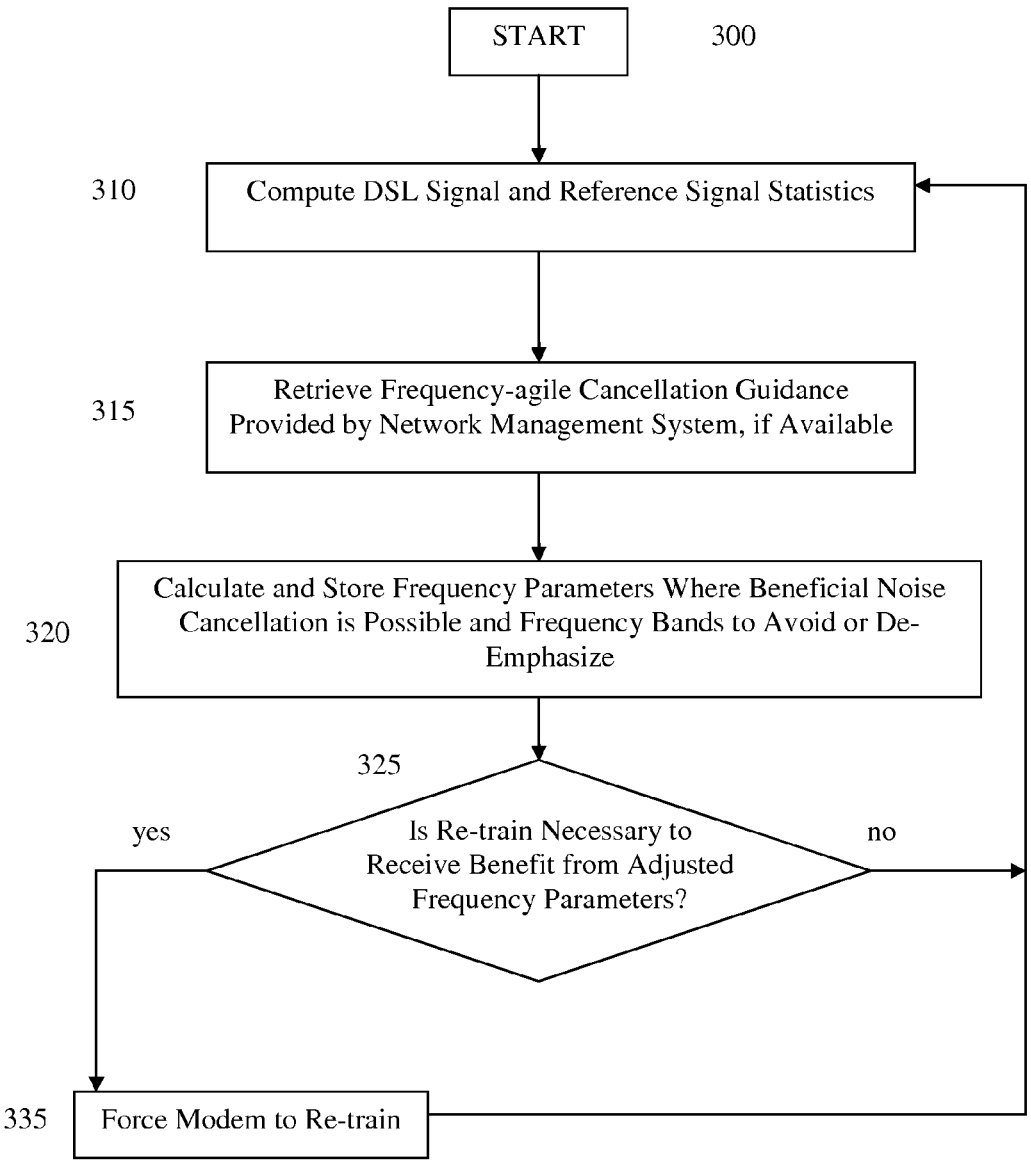
FIG. 3 illustrates a method for computing frequency band cancellation focus parameters.

FIG. 3 illustrates a method 300 of applying beneficial frequency band cancellation guidance such as described above. Note that the method includes a decision branch 325 which will cause the associated modem to retrain at 335 in order to take advantage of the improved noise cancellation.

In FIG. 3, The node 310 "Compute DSL Signal and Reference Signal Statistics" denotes the process of recording Reference Signals (212) and Line Signals (210), and computing derived statistics from these data. The node 315 "Retrieve Frequency-Agile Cancellation Guidance Provided by Network Management System, if Available" corresponds to the collection of parameters and controls from an external network management system. Next, the node 320 "Calculate and Store Frequency Parameters Where Beneficial Noise Cancellation is Possible and Frequency Bands to Avoid or De-Emphasize" denotes the integration of the statistics based on DSL Signal and Reference Signals and external information gathered in the preceding step, to determine frequency bands that may benefit from noise cancellation and which would not. The node 325 "Is Re-train Necessary to Receive Benefit from Adjusted Frequency Parameters" depicts determining whether a modem re-initialization is necessary in order to achieve the benefit of the parameters calculated in the previous step. If a re-initialization is required, then the node 335 "Force Modem to Re-train" denotes the process of inducing a re-initialization in the DSL modem (102).

Another analysis technique within signal analysis function (203) involves correlating a noise reference signal (212) with an estimate of the noise-free DSL data signal in order to determine frequency bands in which cancellation would be likely to cancel the DSL data signal. This analysis involves the acquisition and storing of a noise-free representation of the DSL synch symbol (216). Synchronization acquire and store block (204) performs this function. Those skilled in the art are familiar with synch symbol acquisition techniques. Block (204) acquires and tracks the repetitive DSL synch symbol transmission, captures and stores the synch symbols, and averages many symbols to create a representation of a noise-free synch symbol (216). Some DSL protocols utilize different synch symbols in which case a representation of each unique type is created and stored.

Figure 4:
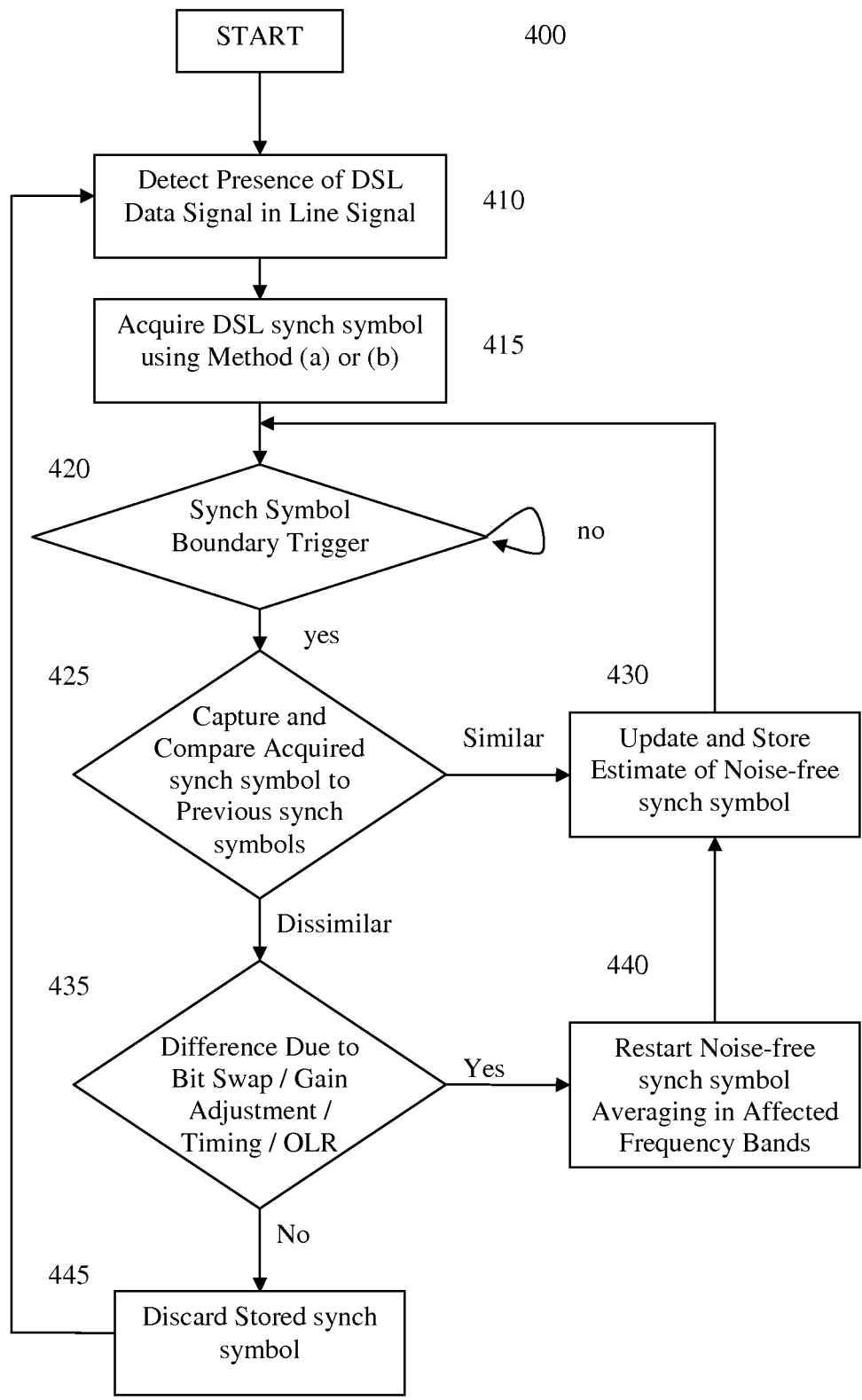
FIG. 4 illustrates a method for synchronization symbol acquisition and tracking.
Figure 5:
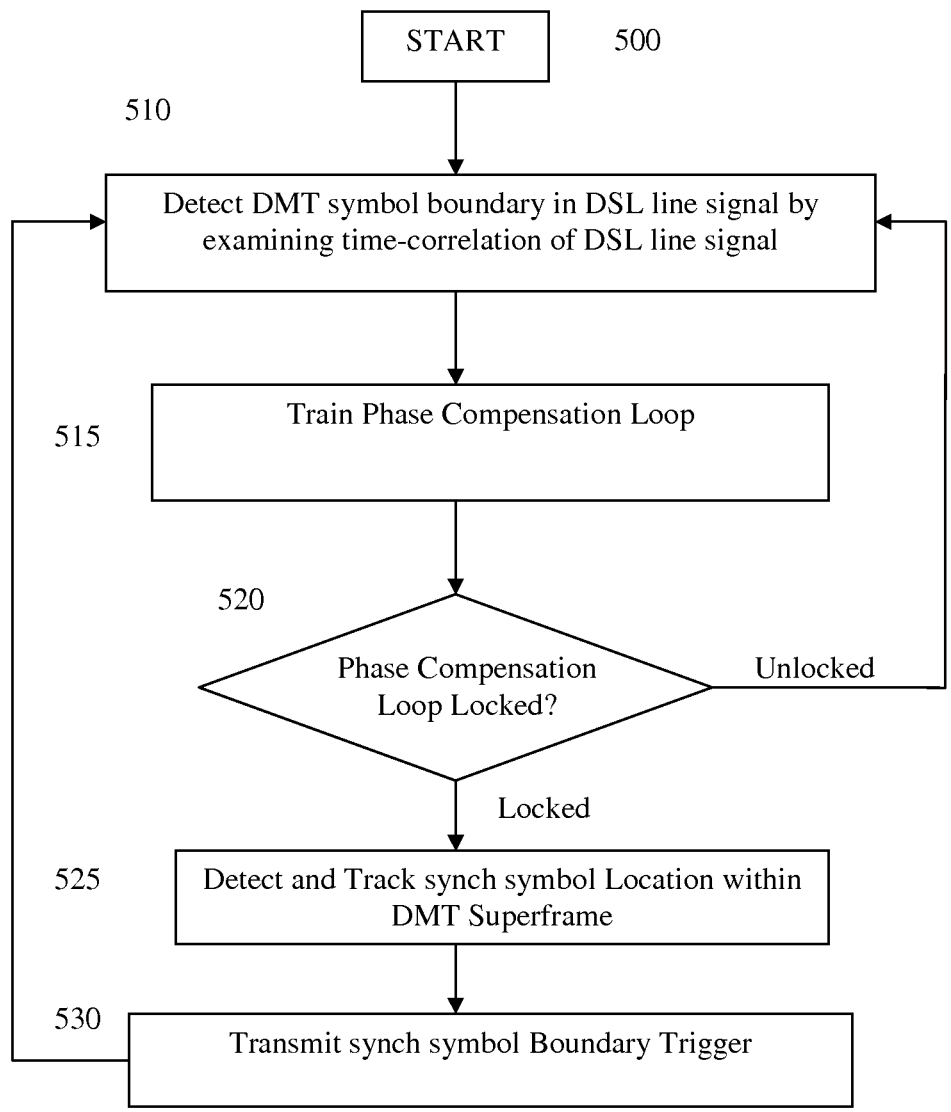
FIG. 5 illustrates method (a) for acquiring DSL synchronization symbol
Figure 6:
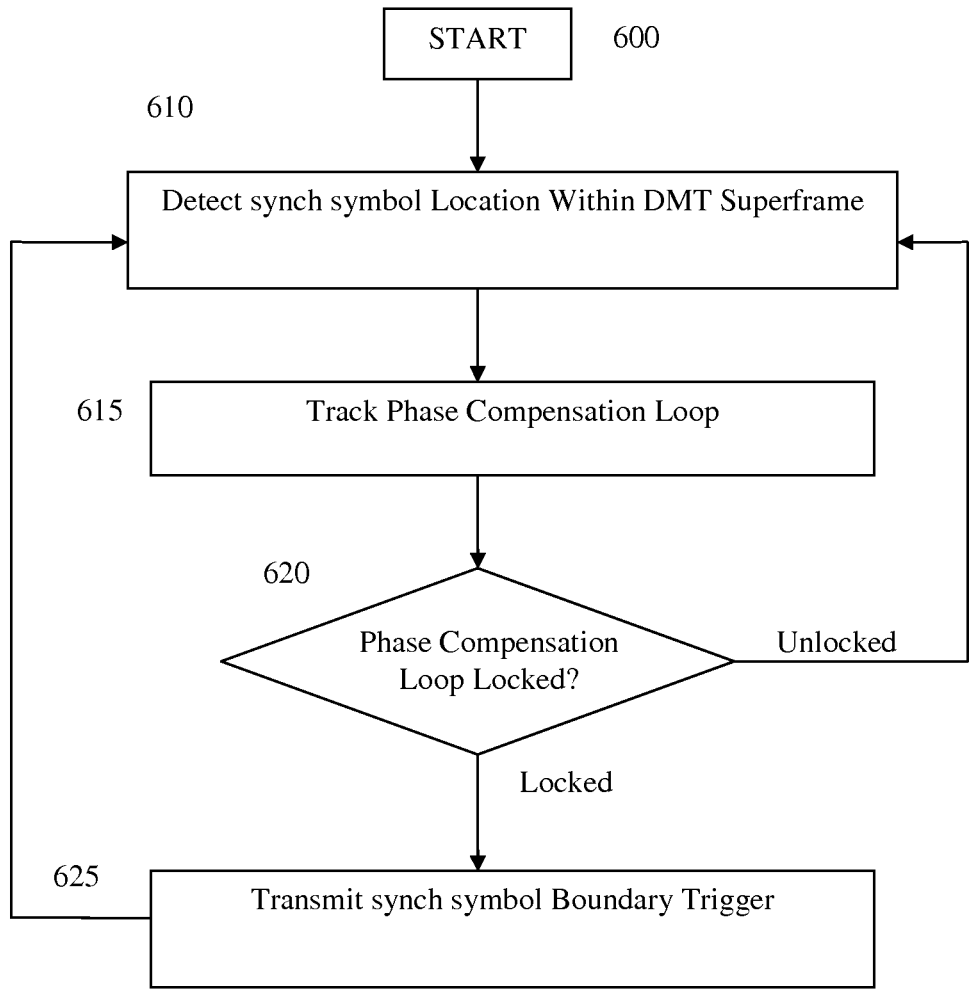
FIG. 6 illustrates method (b) for acquiring DSL synchronization symbol

FIGS. 4, 5 and 6 illustrate methods 400, 500 and 600 for acquiring and tracking synch symbols as described above. Referring to FIG. 4, The first step of the procedure, denoted at 410 as "Detect Presence of DSL Data Signal in Line Signal," verifies that DSL line transmission is currently active on the DSL line (103). Once the presence of a DSL data signal is detected, the synch symbol's timing is acquired in the node 415 denoted "Acquire DSL synch symbol using Method (a) or (b)", where method (a) is depicted in FIG. 5 and method (b) is depicted in FIG. 6. This procedure may occur during the training procedure of the DSL modem (102), during SHOWTIME operation of the DSL modem (102), or during diagnostic operation of the DSL modem (102) such as SELT, DELT, and similar diagnostic modes as familiar to one proficient in the art. Once the most recent synch symbol timing is acquired, the node 420 "Synch Symbol Boundary Trigger" denotes the process of waiting until the next synch symbol boundary is due to occur. Once the next synch symbol is due to occur, the new synch symbol is captured and compared to the previous synch symbol in the node 425 denoted "Capture and Compare Acquired synch symbol to Previous synch symbols". If the current synch symbol is found to be similar to previous synch symbols, then the estimate of the noise-free synch symbol is updated and stored in the node 430 denoted "Update and Store Estimate of Noise-free synch symbol", and control returns to the node 420 "Synch Symbol Boundary Trigger".

If dissimilarity is instead observed, the differences may be due to Bit Swaps, Gain Adjustments, Timing Signaling, or other forms of On-Line Reconfiguration (OLR) actions as defined in applicable DSL transmission standards or proprietary to specific chipset implementations. The node 435 "Difference Due to Bit Swap/Gain Adjustment/Timing/OLR" denotes the process of determining whether the dissimilarly in the most recent synch symbol is attributable to the aforementioned causes. If attributable to such causes, then the node 440 "Restart Noise-free synch symbol averaging in Affected Frequency Bands" represents restarting the process of estimating the noise-free synch symbol in the affected areas of dissimilarity. In one example, gain adjustments may cause the PSD of the synch symbol to change at certain frequencies. The restarting process in the case of a detected gain adjustment corresponds to re-starting the noise sync symbol acquisition process in those frequency bands where the PSD changed as a result of the gain adjustments, while retraining existing estimates of the noise-free sync symbol in the frequency bands where it did not change.

If dissimilarity is detected but is not attributable to a cause detected in the node 435 "Difference Due to Bit Swap/Gain Adjustment/Timing/OLR", then the node 445 "Discard Synch Symbol" denotes the process of deleting and re-initializing the stored noise-free synch symbol. After doing so, control returns to the node 410 denoted "Detect Presence of DSL Data Signal in Line Signal".

FIG. 5 provides detail of an exemplary embodiment (denoted "Method (a)") of the procedure undertaken in the node 415 denoted "Acquire DSL synch symbol Using Method (a) or (b)" in FIG. 4. In this method, the node 510 denoted "Detect DMT Symbol Boundary in DSL line signal by examining time-correlation of DSL line signal" denotes the process of determining the starting and ending time of the DMT symbol framing present in the DSL line signal. This process may be implemented by examining the sample correlation due to cyclic prefixes or suffixes in the DMT symbol, which are a feature of most DSL line transmission standards. Next, a signal phase lock between a local oscillator present in the noise canceller (101) and the far-end oscillator present in e.g. the DSLAM (100) is attained in the node 515 denoted "Train Phase Compensation Loop" by examining the change in the DMT symbol boundary over time. The phase compensation loop may be implemented as any combination of a phase-locked loop (PLL), digital phase-locked loop (DPLL), voltage-controlled oscillator (VCO), voltage-controlled crystal oscillator (VCXO), or other such techniques as would be familiar to one proficient in the art. Next, the node 520 denoted "Phase Compensation Loop Locked?" illustrates the process of determining whether the training of the phase compensation loop was successful and the system remains locked-on to the phase compensation timing. If unlocked, control returns to the node 510 "Detect DMT Symbol Boundary in DSL line signal by examining time-correlation of DSL line signal". Otherwise, the node 525 denoted "Detect and Track synch symbol Location Within DMT Superframe" corresponds to the process of determining the location of the synch symbol within the DMT superframe structure. Several DSL transmission standards define the concept of a superframe, which is comprised of a number of DMT symbols. Based on the determined location, the node 530 "Transmit synch symbol Boundary Trigger" corresponds to generating a trigger, interrupt, signal, flag, or other such indication as known to proficient in the art, at a time indicating when the synch symbol occurs. This trigger is received by other processes requiring synch symbol synchronization such as the decision "Synch Symbol Boundary Trigger" at 840 in FIG. 8. The processing described in this Figure is repeated perpetually by returning to the node 510 "Detect DMT Symbol Boundary in DSL line signal by examining time-correlation of DSL line signal".

Another exemplary embodiment (denoted Method (b)) is shown in FIG. 6. First, the node 610 denoted "Detect synch symbol Location Within DMT Superframe" denotes the process of directly determining the starting and ending time of the DMT symbol framing present in the DSL line signal. Next, a signal phase lock between a local oscillator present in the noise canceller (101) and the far-end oscillator present in e.g. the DSLAM (100) is attained in the node 615 denoted "Track Phase Compensation Loop" by examining the change in the synch symbol boundary over time. The decision node 620 denoted "Phase Compensation Loop Locked?" illustrates the process of determining whether the tracking of the phase compensation loop was successful and the system remains locked-on to the phase compensation timing. If unlocked, control returns to the node 610 "Detect synch symbol Location Within DMT Superframe". Otherwise, based on the determined location, the node 625 "Transmit synch symbol Boundary Trigger" corresponds to generating a trigger, interrupt, signal, flag, or other such indication as known to proficient in the art, at a time indicating when the synch symbol occurs. This procedure is repeated perpetually by returning to the node 610 "Detect synch symbol Location Within DMT Superframe".

In an analysis technique within signal analysis function (203) that involves correlating a noise reference signal (212) with an estimate of the noise-free DSL data signal in order to determine frequency bands in which cancellation would be likely to cancel the DSL data signal, let $s_n^p$ denote the signal from the line (210) during the period of the p-th sync symbol at discrete time n (relative to the beginning of the p-th sync symbol), and $\hat{s}_n$ denote the estimate (216) of the stored noise-free sync symbol at discrete time n (relative to the beginning of the p-th sync symbol), The stored noise-free sync symbol may be computed by averaging $s_n^p$ over a total of P periods as shown below $$\hat{s}_n \leftarrow \frac{1}{P}\sum_p s_n^p.$$

Or through the use of averaging filters such as the following first-order IIR filter:

$$\hat{s}_n \leftarrow \alpha \hat{s}_n + (1-\alpha) s_n^P$$

Where $\alpha$ is an adaptation parameter controlled by the noise cancellation control block (200).

It is noted that the stored noise-free synch symbol can be used as an estimate of the transmitted noise-free data signal during periods of synch symbol transmission. Therefore, correlating a noise reference signal (219) with the stored noise-free synch symbol (216) during periods of synch symbol transmission yields an indication of frequency bands in which residual correlated data signal is present in the noise reference signal. This information is used to direct noise cancellation control block (200) to avoid or de-emphasize frequency band cancellation attempts in such frequency bands in order to avoid detrimental cancellation of the DSL data signal.

In one embodiment of this analysis technique, let $\hat{s}_n$ denote the estimate (216) of the stored noise-free sync symbol at discrete time n (relative to the beginning of the sync symbol), and $r'_n$ denotes noise reference signal (219) at discrete time n (relative to the beginning of the sync symbol). Then compute $$C_n \leftarrow \text{FFT}[\hat{s}_n \cdot r'_n],$$

Where FFT denotes the Fast Fourier transform operation. The frequency bands to be avoided are selected as those for which a prescribed function of $C_n$, denoted $f(C_n)$ takes on values exceeding a specified threshold.

One embodiment of the invention has the ability to 'clean-up' the noise reference signal by reducing or eliminating a residual DSL data signal that may be present in the noise reference signal. A discussion follows of blocks 207, 208 and 209 that perform this function. Even with this noise clean-up function, the above described frequency band cancellation avoidance function is helpful because the clean-up process is not perfect. Another embodiment of the invention does not have blocks 207-208 in which case the frequency band cancellation avoidance function described above is more important.

Yet another analysis technique within signal analysis function (203) involves analyzing a noise reference signal (212) together with an estimated line noise signal (218) in order to determine which frequency bands are most likely to produce beneficial noise cancellation. The estimated line noise signal is produced by subtracting the above mentioned stored noise-free synch signal (216) from the data line transmitted signal (210) during the synch transmission period. Summation block (206) performs this function. Correlation of a noise reference signal with the estimated line noise signal yields a representation of frequency bands that will produce the most effective line noise cancellation. Signal analysis block (203) prioritizes and combines this frequency band information with the frequency band results of all other signal analysis processes to yield an optimized aggregate frequency guide (217) for noise cancellation control block (200).

In one embodiment of this analysis technique, let $s_n^P$ denote the signal from the line (210) during the period of the p-th sync symbol at discrete time n (relative to the beginning of the p-th sync symbol), and $\hat{s}_n$ denote the estimate (216) of the stored noise-free sync symbol at discrete time n (relative to the beginning of the p-th sync symbol). Then the estimated line noise signal $n_n^P$ at discrete time n (relative to the beginning of the p-th sync symbol), may be computed as $$n_n^P \leftarrow s_n^P - \hat{s}_n.$$

Finally, the frequency bands that afford useful noise cancellation may be computed by examining the estimated line noise frequency content for frequencies where high noise is present. One embodiment of this process is described as follows. Let $w_n$ denote a predefined windowing function at discrete time n, FFT denote the fast Fourier transform operation, and $n_n^P$ denote the estimated noise PSD at discrete frequency n. Then compute $$N_n \leftarrow \text{FFT}[w_n \cdot n_n^P].$$

Frequency bands that provide possible cancellation may be deduced by finding discrete frequencies n where the values of $N_n$ are large in magnitude, where the values of $N_n$ correspond to known interference sources (such as known television harmonic frequencies, or known AM transmit frequencies). A second embodiment of the process of identifying useful frequency bands may be expressed mathematically as follows. Define $C_n$ as $$C_n \leftarrow \text{FFT}[w_n \cdot r'_n \cdot n_n^P].$$

Where $r'_n$ denotes the signal (219). The frequency bands that provide possible noise cancellation may then be selected as those for which a prescribed function of $C_n$, denoted $f(C_n)$ takes on values exceeding a specified threshold.

In addition to optimizing frequency band cancellation guidance information, signal analysis function (203) can provide guidance to noise canceller control block (200) regarding specific cancellation parameters within each frequency band. Examples include optimizing the settings of energy thresholds used to enable adaptation, adaptation time constants, coefficient decay time constants, adaptation suspend guidelines, and installing stored coefficients that have been found to match a certain detected noise characteristic. Analysis of characteristics of noise reference signals (212) such as PSD, noise type, bandwidth, duration and repetition rate can provide guidance on each of these parameters. For example, if a noise characteristic is determined to vary at a moderately fast pace, then the adaptation coefficients may be directed to adapt sufficiently fast so as to keep up with noise cancellation. Alternately, if an impulse noise source is found to have a burst on/off nature, then the coefficients may be directed to hold during the off periods so that they have correct value when the impulse noise returns. In another example, if an excessively high impulse noise signal is detected then the coefficients may be directed to suspend adaptation so that the excess energy does not throw off the noise cancellation filter (201). Analysis routines can prioritize the noise cancellation of each detected noise source based on its calculated or actual effect on user throughput or quality of service.

Some embodiments may include a communication path to the local modem in which case some of the above signal information may be obtained by a query to the local modem. Examples include line noise, signal PSD and utilized frequency bands. Obtaining error rate information from the local modem, if available, can be used as feedback to further guide frequency band cancellation focus or other parameters.

In addition to guidance from local signal analysis via function (203) or a local modem, one embodiment of the invention receives input and configuration parameters from a centralized network performance management system such that DSL performance is further enhanced. A network entity can provide frequency band cancellation band guidance information, and can provide input to or control of any of the other cancellation parameters discussed above. In general, a network management entity has a considerably greater knowledge of network behavior than any local device, and therefore is in a position to beneficially guide the function of a local device.

Figure 7:
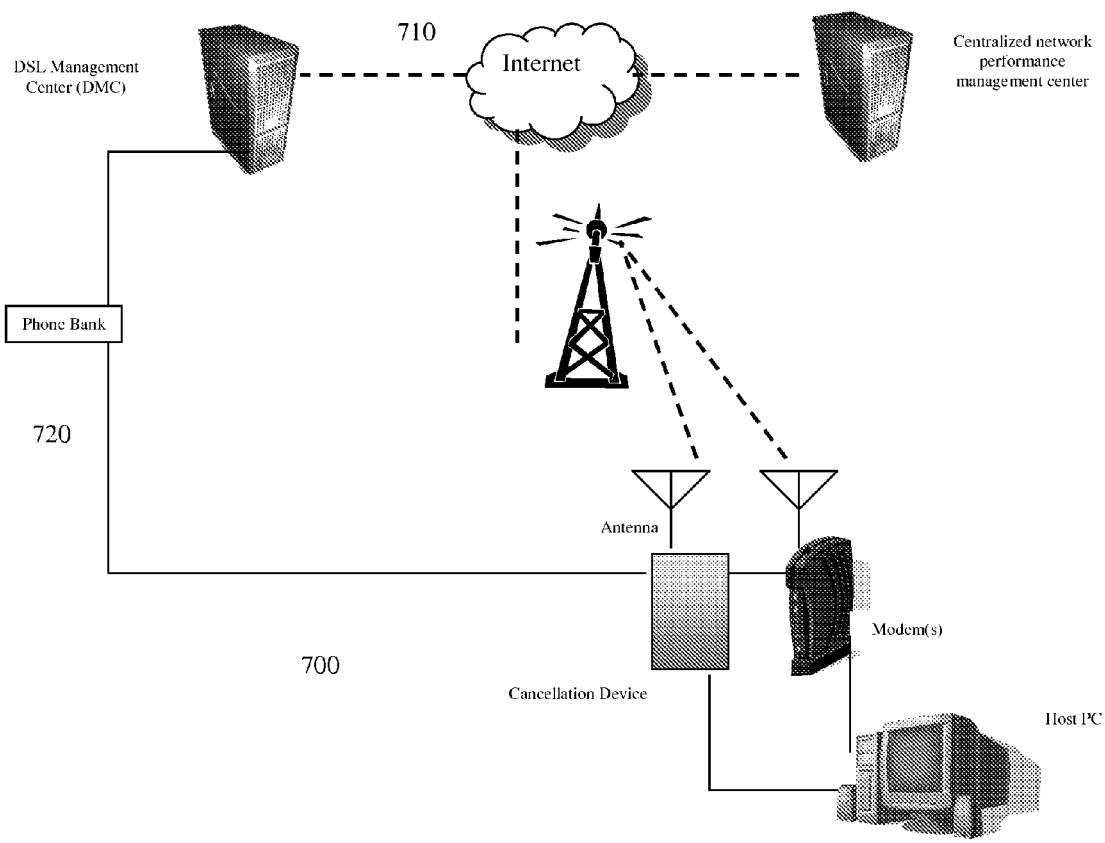
FIG. 7 illustrates possible communication channels between a Centralized network performance management center and the invention

FIG. 7 illustrates a system 700 with several possible communication channels between a Centralized network performance management center and an embodiment of the invention, including an internet communication channel 710 and/or a landline telephone communication lines 720 or a wireless cellular communication channels 730.

One embodiment of the invention includes three techniques to overcome the detrimental data signal cancellation that results when residual DSL data signal energy is present in a noise reference signal. Each of the techniques exploits the repetitive nature of the DSL synch symbol to avoid or mitigate the undesired data signal cancellation. These techniques may be used individually or in any combination.

Referring to FIG. 2, each of these techniques utilizes the stored noise-free representation of the synch symbol (216). Acquire and store of the noise-free synch symbol is performed by function (204) as described above.

The first of the three techniques involves subtracting the majority of the residual DSL data signal out of the noise reference signals. This is called the reference 'clean-up' process. Again referring to FIG. 2, adaptive reference clean-up filters (208a-n) extract from the DSL line signal (210) a reference clean-up signal (215) that contains the inverse image of the residual DSL data signal that is present in the noise reference signals. Adders (209a-n) combine reference clean-up signal (215) with noise reference signals (212) thereby causing cancellation of the residual DSL data signal components present in the noise reference signals.

Reference clean-up control function (207) adapts reference clean-up filter coefficients to achieve optimal removal of residual DSL data signals from the noise reference signals (212). Function (207) accomplishes optimized data removal (reference clean-up) by utilizing the stored noise-free synch symbol (216) as a representation of the noise free data signal for the purpose of training reference clean-up filter coefficients. It is noted that this representation is valid only during synch symbol transmissions therefore function (207) updates coefficients only during synch symbol periods. Because the stored synch symbol represents only the data signal component of the DSL line signal (i.e. does not contain the line noise), the trained confinements respond only to the removal of the unwanted DSL data signal present in the noise reference signals. Furthermore, because the DSL data signal on the line is broadband and larger than the noise signal on the line, the coefficient training is determined by the solution to removal of the unwanted data. It is noted that under this condition the noise on the DSL line (210) combines with noise in the noise reference signal (212) to modify the noise reference signal used by the noise cancellation filters (210). Adaptive cancellation filters (210) adapt to accommodate the altered noise reference without diminishing the cancellation potential.

In one embodiment of the invention, let $x_n$ denote the signal from the line (210) at discrete time n, and $r_n$ denote the Ref. a signal (212) at discrete time n, after any applicable filtering. The filter (208(n)) comprises a finite-impulse response (FIR) filter, whose taps are denoted by $w_n$ and are controlled by the Ref. Clean-Up Control (207). The cleaned-up reference signal r'$_n$ (219) at discrete time n may then be computed as $$r'_n \leftarrow r_n - w_n * x_n$$

where * denotes discrete-time convolution. Let ŝ$_n$ denote the estimate (216) of the stored noise-free sync symbol at discrete time n (relative to the beginning of a sync symbol). The filter (208(n)) comprises a finite-impulse response (FIR) filter, whose taps are denoted by w$_n$ and may be updated according to the following LMS or RLMS equations:

$$w_n \leftarrow w_n + \mu(\hat{s}_n \cdot r'_n)$$

Or:

$$w_n \leftarrow w_n + \mu\left(\frac{r'_n}{|r'|} \cdot \hat{s}_n\right)$$

Where μ is a parameter adjusted by the Ref. Clean-up control (207) and |r'| denotes the average power of the signal r'$_n$. Although shown in the preceding steps as time-domain processing operations, it is understood to those knowledgeable in the art that equivalent processing may be effected in the Fourier domain.

Figure 8:
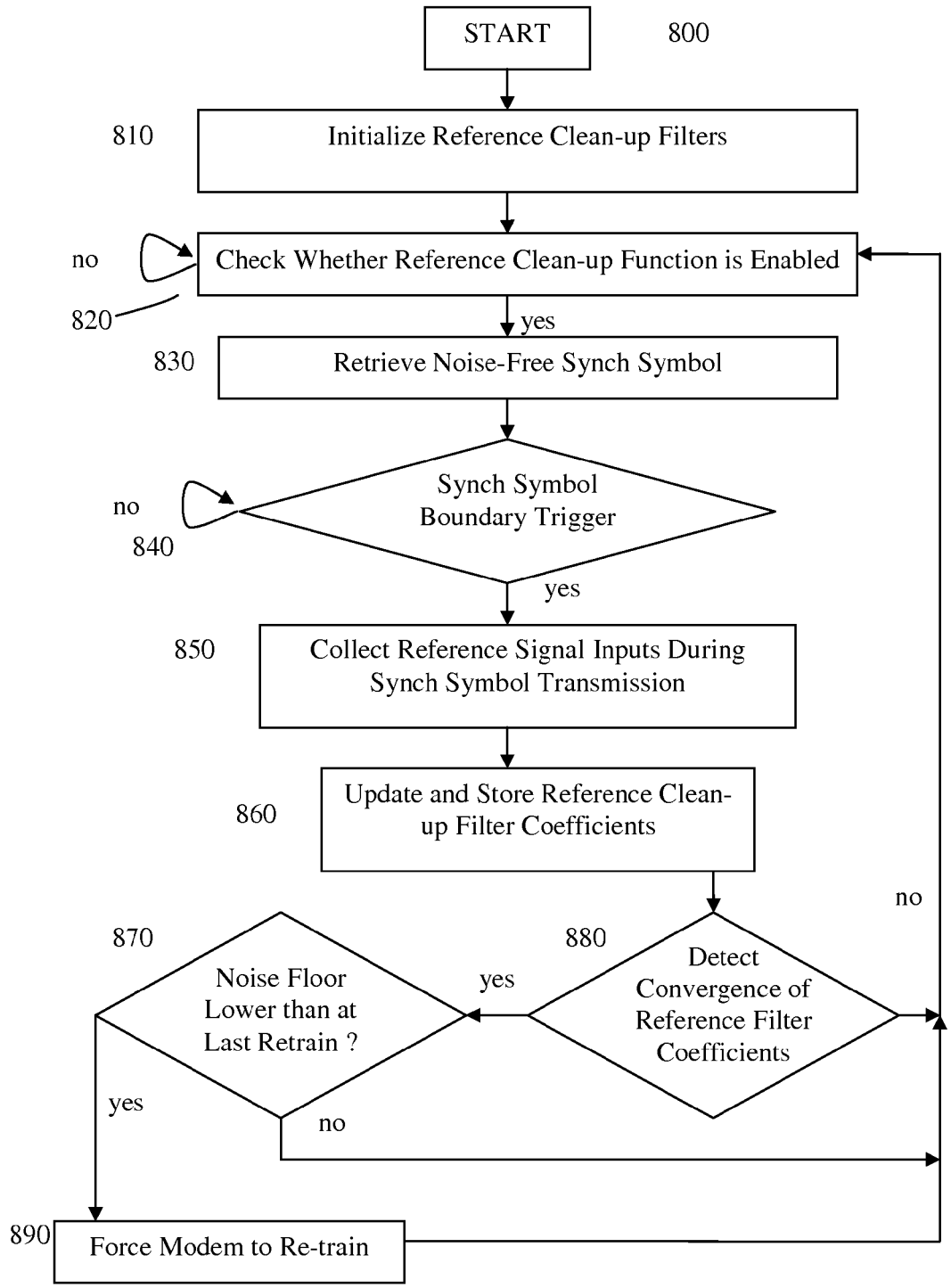
FIG. 8 illustrates a method of reference clean-up processing

FIG. 8 illustrates a method 800 of reference clean-up processing as described above. The node 810 "Initialize Reference Clean-up Filters" denotes an initial coefficient setting being stored into the Reference clean-up filter (206) coefficients upon startup. The next step 820 of the process, denoted "Check Whether Reference Clean-up Function is Enabled" corresponds to verifying whether the operation of the reference clean-up processing is currently administratively enabled or disabled by the Reference Clean-up Control logic (207). If disabled, then processing pauses at this step until reference clean-up processing is enabled. The next step 830 is to retrieve stored values for the noise-free synch symbol as indicated in the node "Retrieve Noise-Free Synch Symbol". In the node 840 denoted "Synch Symbol Boundary Trigger", processing loops until a trigger is received indicating the time when a synch symbol is due to be received on the DSL line input (210). The signals from the Noise Reference Inputs (212) are next collected at a time synchronous with the reception of the synch symbol on the line (210) in the step 850 "Collect Reference Signal Inputs During Synch Symbol Transmission". The data from the previous two steps is then used by the Reference Clean-up Control logic (207) to update the Reference Clean-up Filter(s) coefficients and store the updated coefficients in the node 860 "Update and Store Reference Clean-up Filter Coefficients". Based on the variation of the Reference Clean-up Filter(s) coefficients, convergence of the coefficients is detected in the node 880 "Detect Convergence of Reference Filter Coefficients". If the reference filter coefficients have not converged, then control returns to the node 820 "Check Whether Reference Clean-up Function is Enabled". If coefficients have converged, then the node 870 "Noise Floor Lower than at Last Retrain" analyzes the current benefit afforded by reference clean-up processing and compares it to the noise floor reduction benefit available at the last time the modem (102) re-trained. If the noise floor has been reduced beyond a threshold level, the modem (102) is forced to retrain in the node 890 "Force Modem to Retrain". Control then returns to the node 820 "Check Whether Reference Clean-up Function is Enabled".

The second technique uses the noise-free stored synch symbol to create repetitive periods of simulated data transmission silence during which the data cancellation coefficients can be updated without the risk of DSL data signal cancellation. Referring to FIG. 2, these periods are created during synch symbol transmission by subtracting the stored sync symbol (216) from the noise cancellation error signal (213) as implemented by adder (205). Because there is little to no data signal present in the cancellation error signal (213) during these periods of simulated data transmission silence, adaptation of the cancellation coefficients does not result in data signal cancellation on the DSL line. When utilizing this technique, the primary DSL noise cancellation loop, managed by noise cancellation control block (200), is therefore updated only during the periods of simulated data silence.

Let ŝ$_n$ denote the estimate (216) of the stored noise-free sync symbol at discrete time n (relative to the beginning of a sync symbol), x$_n$ denote the modem signal (213) at discrete time n (relative to the beginning of a sync symbol), and r'$_n$ (219) denote the cleaned-up reference signal at discrete time n (relative to the beginning of a sync symbol). The filter (201) comprises a finite-impulse response (FIR) filter, whose taps are denoted by w$_n$ and may be updated according to the following LMS equation:

$$w_n \leftarrow w_n + \mu(r'_n \cdot (x_n - \hat{s}_n))$$

Where μ is a parameter adjusted by the noise cancellation control block (200). Although shown in the preceding steps as time-domain processing operations, it is understood to those knowledgeable in the art that equivalent processing may be effected in the Fourier domain.

Figure 9:
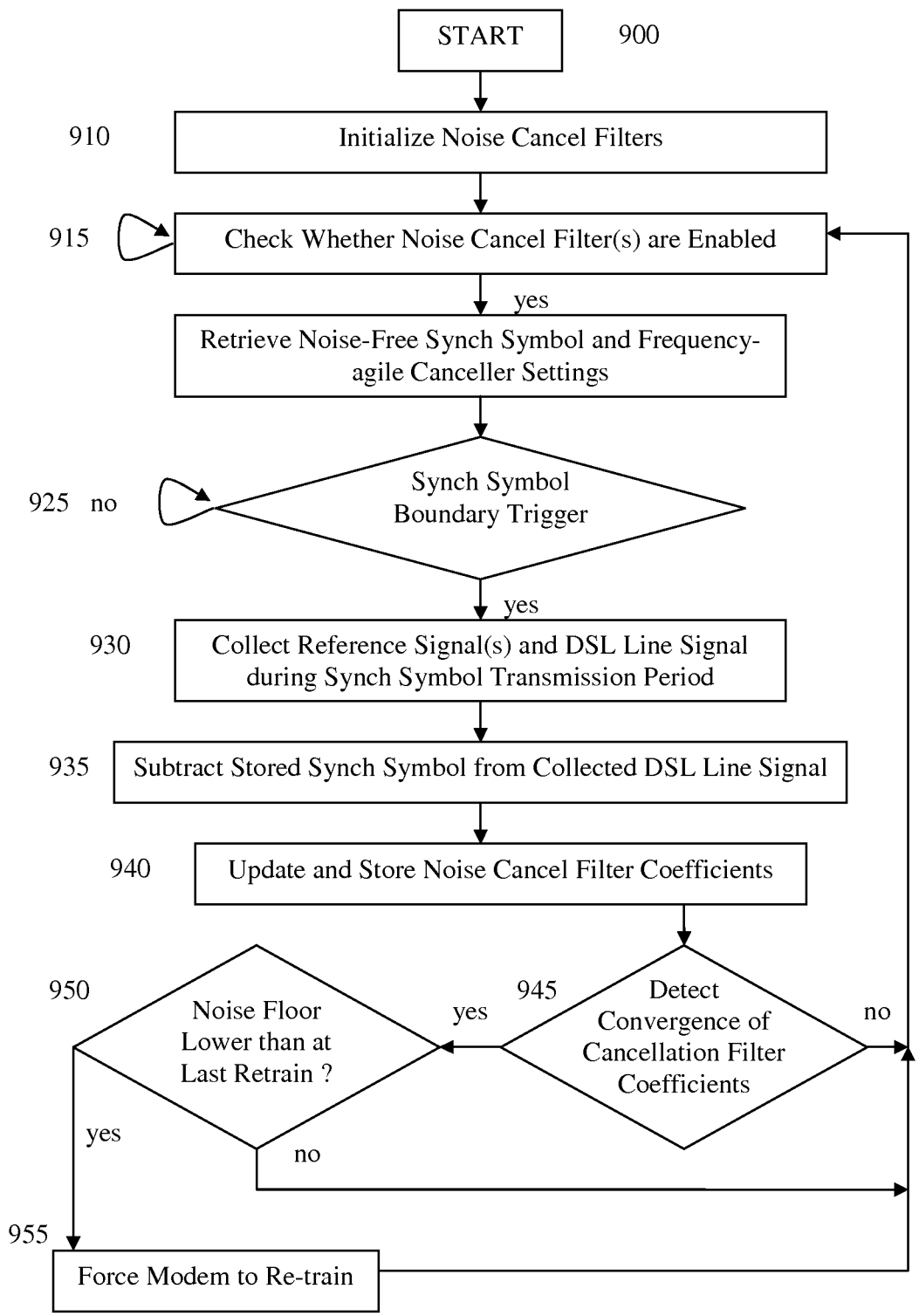
FIG. 9 illustrates a method for using noise-free synch symbol to create simulated transmission silence.

FIG. 9 illustrates a method for using noise-free synch symbol to create simulated transmission silence. First, the node 901 "Initialize Noise Cancel Filters" denotes an initial coefficient setting being stored into the Noise cancel filter (201) coefficients upon startup. The next step 915 of the process, denoted "Check Whether Noise Cancel Filter(s) are Enabled" corresponds to verifying whether the operation of the noise cancel processing is currently administratively enabled or disabled by the Noise cancellation control logic (200). If disabled, then processing pauses at this step until noise cancel processing is enabled. The next step 920 is to retrieve stored values for the noise-free synch symbol and for frequency-agile noise cancellation, as indicated in the node 920 "Retrieve Noise-Free Synch Symbol and Frequency-agile Canceller Settings". The decision node 925 denoted "Synch Symbol Boundary trigger" represents the process of waiting until the next synch symbol boundary is due to be received on the DSL line input (210). The signals from the Noise Reference Inputs (212) and Line Inputs (210) are next collected at a time synchronous with the transmission of the synch symbol on the Line Input (210) in the step 930 "Collect Reference Signal(s) and DSL Line Signal During Synch Symbol Transmission Period". In the node 935 "Subtract Stored Synch Symbol from Collected DSL Line Signal", the collected DSL line input is subtracted from the stored noise-free synch symbol to create a simulated period of transmission silence. Next, the Noise Cancellation Control logic (200) updates the Noise Cancel Filter(s) (201) coefficients and store the updated coefficients in the node 940 "Update and Store Noise Cancel Filter Coefficients". Based on the variation of the Noise Cancel Filter(s) coefficients, convergence of the cancellation filter coefficients is detected in the node 945 "Detect Convergence of Cancellation Filter Coefficients". If the coefficients have not converged, then control returns to the node 915 "Check Whether Noise Cancel Filter(s) are Enabled". If coefficients have converged, then the node 950 "Noise Floor Lower than at Last Retrain" analyzes the current benefit afforded by reference clean-up processing and compares it to the noise floor reduction benefit available at the last time the modem (102) re-trained. If the noise floor has been reduced beyond a threshold level, the modem (102) is forced to retrain in the node 955 "Force Modem to Retrain". Control then returns to the node 915 "Check Whether Noise Cancel Filters are Enabled".

In some cases it may be advantageous to implement both of the above techniques to achieve maximum benefit. It will be noted, however, that the second technique results in considerably slower adaptation. For this reason some embodiments may choose to implement only the first technique in order to achieve a faster tracking DSL noise cancellation loop.

The third technique involves avoidance, or de-emphasis, of attempted noise cancellation in frequency bands in which correlation is detected between the noise reference signal and the DSL data signal. Correlation between the noise reference signal and the noise-free stored synch symbol is measured during periods of synch symbol transmission. This analysis identifies frequency bands in which a correlated DSL data signal is present in the noise reference signal. This third technique works in conjunction with a frequency band agile noise cancellation process that can be guided to avoid or deemphasize a cancellation attempt in the bands in which correlation has been detected. Frequency bands in which the noise reference signal can be helpful are exploited whereas detrimental frequency bands are avoided or deemphasized.

Another technique to overcome the detrimental data signal cancellation that results when residual DSL data signal energy is present in a noise reference involves the use of memory and averaging or predicting processes. This approach is useful when noise reference signals of interest are periodic in nature, such as noise generated by 60 Hz harmonics, television sets, computer displays, power supplies or electric motors. By analyzing or averaging a multiplicity of signal samples over time, each of which is periodic with a noise signal of interest, the detrimental DSL data signal can be suppressed. Various pattern recognition techniques can be used to detect and synchronize sampling to a periodic signal within noise reference signal. An averaging process can be used to enhance the periodic reference signal of interest while depressing the detrimental residual DSL signal. Another technique involves the use of predictive or iterative techniques to create an estimate of the periodic signal of interest. It will be noted that these techniques are also useful for extracting periodic noise reference signals of interest from other forms of unwanted signal energy.

It will be readily understood by those skilled in the art that any or all of the functional blocks in one embodiment of the invention may be implemented using analog techniques, or by a mix of analog and digital techniques wherein the digital processing may be implement either by hardware logic or by microprocessor and software technology. It will be further readily understood by those skilled in the art that the digital signal process can be performed in the time domain or by a mix of time and frequency domain processing.

Three techniques have been described to overcome the problems resulting from a residual data signal in a noise reference signal, and numerous techniques have been described to optimize the frequency band focus of the noise cancellation for enhanced DSL performance. The preferred embodiment incorporates all of these techniques working in concert. Alternate embodiments may incorporate any sub-set of these techniques.

The invention claimed is:

1. A method in a noise cancellation system, comprising:
   receiving, via a noise reference signal input port, thereof a noise reference signal, the noise reference signal comprising energy from a Digital Subscriber Line (DSL) data signal transmitted on a DSL transmission line to which the noise cancellation system is coupled; and
   reducing noise in the DSL data signal transmitted on the DSL transmission line, according to a first procedure which includes:
   a first step of creating a noise free representation of a DSL synchronization symbol repeatedly occurring in the transmitted DSL data signal; and
   a second step of reducing the noise in the transmitted DSL data signal based on the noise free representation of the DSL synchronization symbol and the received noise reference signal;
   wherein the method further comprises:
   acquiring the DSL synchronization symbol based on the first procedure; and
   determining whether a boundary of a next synchronization symbol is due to occur.

2. The method of claim 1, wherein reducing the noise in the transmitted DSL data signal based on the noise free representation of the DSL synchronization symbol and the received noise reference signal comprises training a reference clean-up function with the noise-free representation of the DSL synchronization symbol, the reference clean-up function to reduce the energy from the transmitted DSL data signal in the received noise reference signal.

3. The method of claim 1, wherein reducing the noise in the transmitted DSL data signal based on the noise free representation of the DSL synchronization symbol and the received noise reference signal comprises subtracting the noise-free representation of the DSL synchronization symbol from a noise cancellation error signal during the repeated occurrences of the DSL synchronization symbol in the transmitted DSL data signal to create repeated periods of simulated absence of transmission of the DSL data signal on the DSL transmission line; and
   wherein, after an initial training sequence, the noise cancellation system is trained during such repeated periods of simulated absence of transmission of the DSL data signal on the DSL transmission line so that energy from the DSL data signal is not used to train the noise cancellation.

4. The method of claim 1 wherein reducing the noise in the transmitted DSL data signal based on the noise free representation of the DSL synchronization symbol and the received noise reference signal comprises:
   subtracting the noise-free representation of the DSL synchronization symbol from the DSL synchronization symbol when repeatedly occurring in the transmitted DSL data signal to generate an estimate of noise in the transmitted DSL data signal; and
   analyzing the estimate of noise in the transmitted DSL data signal and the noise reference signal to identify one or more frequency bands in the transmitted DSL data signal to which to apply a noise cancellation signal.

5. The method of claim 1, wherein the received noise reference signal is a signal selected from a group comprising:
   a derivation of a common mode signal transmitted on the DSL transmission line;

a derivation of a common mode signal transmitted on a telephone line located nearby the DSL transmission line;
a derivation of a differential mode signal transmitted on a telephone line located nearby the DSL transmission line;
a common mode signal or differential mode signal transmitted on a wire that is a member of one or more twisted wire pairs combined within or separate from a common binder of twisted wire pairs coupled to the noise cancellation system,
a radio frequency signal obtained from an antenna located nearby the DSL line, and
a ground reference signal.

6. The method of claim 5, wherein the group further comprises of: a 60 hertz harmonic signal,
a television signal,
a computer monitor or video display device signal, a power supply signal, and
an electric motor signal.

7. The method of claim 6, comprises:
sampling the periodic noise reference signal over time to obtain a plurality of samples of the periodic noise reference signal; and
averaging the plurality of samples, thereby creating an averaged periodic noise reference signal, wherein reducing the noise in the transmitted DSL data signal based on the noise free representation of the DSL synchronization symbol and the received noise reference signal comprises reducing the noise in the transmitted DSL data signal based on the noise free representation of the DSL synchronization symbol and the averaged periodic noise reference signal.

8. The method of claim 1, wherein reducing the noise in the transmitted DSL data signal based on the noise free representation of the DSL synchronization symbol and the received noise reference signal comprises:
generating a noise cancellation signal from the received noise reference signal based on noise present in the transmitted DSL data signal, the generation of the noise cancellation signal performed in accordance with a programmable wide bandwidth filter, and one or more narrow bandwidth filters programmable to generate a noise cancellation signal to reduce noise associated with narrow bandwidth signals in the transmitted DSL data signal; and
combining the noise cancellation signal with the transmitted DSL data signal to reduce the noise in the transmitted DSL data signal.

9. The method of claim 1, wherein reducing the noise in the transmitted DSL data signal based on the noise free representation of the DSL synchronization symbol and the received noise reference signal comprises:
generating a noise cancellation signal from the received noise reference signal based on noise present in the transmitted DSL data signal, the generation of the noise cancellation signal including analyzing characteristics of the received noise reference signal and adapting the generated noise cancellation signal responsive thereto except when the analyzing detects characteristics indicating the presence of excessively high impulse noise.

10. The method of claim 1, further comprising amplifying the reduced noise transmitted DSL data signal to reduce the detrimental effect of a noise floor associated with a modem that processes the signal.

11. The method of claim 1, wherein the noise cancellation system is integrated with a DSL modem, the method further comprising transmitting the reduced noise transmitted DSL data signal to the modem via an internal communication path between the noise cancellation system and the DSL modem.

12. The method of claim 1 comprising: capturing the next synchronization symbol when it is determined that the boundary of the new synchronization symbol is due to occur.

13. The method of claim 12 comprising: comparing the next synchronization symbol with the DSL synchronization symbol to determine whether the new DSL synchronization symbol is similar to the DSL synchronization symbol.

14. The method of claim 13 comprising: estimating a noise-free synchronization symbol when it is determined that the new DSL synchronization symbol is similar to the DSL synchronization symbol.

15. The method of claim 14 comprising: storing the estimated noise-free synchronization symbol.

16. The method of claim 13 comprising determining, when the comparing indicates that the new DSL synchronization symbol is different from the DSL synchronization symbol, whether the difference is caused by one of: bit swaps, gain adjustments, timing signaling, or on-line reconfiguration.

17. The method of claim 16 comprising: restarting estimation of a noise-free synchronization symbol in an area affected by the difference.

18. The method of claim 17 comprising: discarding a stored noise-free synchronization symbol in response to determining that the difference is not caused by one of bit swaps, gain adjustments, timing signaling, or on-line reconfiguration.

19. A noise cancellation system, comprising:
a noise reference signal input port that receives a noise reference signal, the noise reference signal comprising energy from a Digital Subscriber Line (DSL) data signal transmitted on a DSL transmission line to which the nose cancellation system is coupled;
a DSL data signal input port that receives the DSL data signal transmitted on the DSL transmission line to which the DSL data signal port is coupled;
a processor programmed to perform logic according to a first procedure to reduce noise in the transmitted DSL data signal, wherein the first procedure includes:
a first step of a synchronization block coupled to the DSL data signal input port to create a noise free representation of a DSL synchronization symbol repeatedly occurring in the transmitted DSL data signal; and
a second step of noise cancellation logic coupled to the synchronization block, the DSL data signal input port, and the noise reference signal input port, to reduce the noise in the transmitted DSL data signal based on the noise free representation of the DSL synchronization symbol and the received noise reference signal;
wherein the processor is programmed to:
acquire the DSL synchronization symbol based on the first procedure; and
determine whether a boundary of a next synchronization symbol is due to occur.

20. The system of claim 19, wherein the noise cancellation logic to reduce the noise in the transmitted DSL data signal based on the noise free representation of the DSL synchronization symbol and the received noise reference signal comprises reference clean-up logic to train a reference clean-up function with the noise-free representation of the DSL synchronization symbol, the reference clean-up function to reduce the energy from the transmitted DSL data signal in the received noise reference signal.

21. The system of claim 19, wherein the noise cancellation logic to reduce the noise in the transmitted DSL data signal based on the noise free representation of the DSL synchronization symbol and the received noise reference signal comprises adder logic to subtract the noise-free representation of the DSL synchronization symbol from a noise cancellation error signal during the repeated occurrences of the DSL synchronization symbol in the transmitted DSL data signal to create repeated periods of simulated absence of transmission of the DSL data signal on the DSL transmission line; and wherein, after an initial training sequence, the noise cancellation system is trained during such repeated periods of simulated absence of transmission of the DSL data signal on the DSL transmission line so that energy from the DSL data signal is not used to train the noise cancellation system.

22. The system of claim 19, wherein the noise cancellation logic to reduce the noise in the transmitted DSL data signal based on the noise free representation of the DSL synchronization symbol and the received noise reference signal comprises adder logic to subtract the noise-free representation of the DSL synchronization symbol from the DSL synchronization symbol when repeatedly occurring in the transmitted DSL data signal to generate an estimate of noise in the transmitted DSL data signal; and wherein the signal analysis block is coupled to the adder logic to analyze the estimate of noise in the transmitted DSL data signal and the noise reference signal to identify the one or more frequency bands in the transmitted DSL data signal to which to apply the noise cancellation signal.

23. The system of claim 19, wherein the received noise reference signal is a signal selected from a group comprising:

a derivation of a common mode signal transmitted on the DSL transmission line; a derivation of a common mode signal transmitted on a telephone line located nearby the DSL transmission line;

a derivation of a differential mode signal transmitted on a telephone line located nearby the DSL transmission line;

a common mode signal or differential mode signal transmitted on a wire that is a member of one or more twisted wire pairs combined within or separate from a common binder of twisted wire pairs coupled to the noise cancellation system, a radio frequency signal obtained from an antenna located nearby the DSL line, and a ground reference signal.

24. The system of claim 23, wherein the received noise reference signal comprises: a 60 hertz harmonic signal, a television signal, a computer monitor or video display device signal, a power supply signal, and an electric motor signal.

25. The system of claim 19, wherein the noise cancellation logic to reduce the noise in the transmitted DSL data signal comprises:

adaptive noise cancellation filter logic to generate a noise cancellation signal from the received noise reference signal based on noise present in the transmitted DSL data signal, the filter logic including a programmable wide bandwidth filter, and one or more narrow bandwidth filters programmable to generate the noise cancellation signal to reduce noise associated with narrow bandwidth signals in the transmitted DSL data signal; and combiner logic coupled with the filtering logic to combine the noise cancellation signal with the transmitted DSL data signal to reduce the noise in the transmitted DSL data signal.

26. The system of claim 19, wherein the noise cancellation logic to reduce the noise in the transmitted DSL data signal is to generate the noise cancellation signal from the received noise reference signal based on noise present in the transmitted DSL data signal, the generation of the noise cancellation signal adapted based on characteristics of the received noise reference signal except when the analysis block detects characteristics indicating the presence of excessively high impulse noise in the received noise reference signal.

27. The system of claim 19, further comprising combiner logic to amplify the reduced noise transmitted DSL data signal to reduce the detrimental effect of a noise floor associated with a modem that processes the signal.

28. A method in a noise cancellation system, comprising:

receiving, via a noise reference signal input port, thereof a noise reference signal, the noise reference signal comprising energy from a Digital Subscriber Line (DSL) data signal transmitted on a DSL transmission line to which the noise cancellation system is coupled; and reducing noise in the DSL data signal transmitted on the DSL transmission line, according to a second procedure which includes:

a first step of analyzing at least one of the received noise reference signal and the transmitted DSL data signal to identify one or more frequency bands in which to de- emphasize noise cancellation in the transmitted DSL data signal; and a second step of causing the noise cancellation system to de-emphasize noise cancellation in the identified one or more frequency bands of the transmitted DSL data signal, responsive to the analysis:, wherein the method further comprises:

acquiring the DSL synchronization symbol based on the second procedure; and determining whether a boundary of a next synchronization symbol is due to occur.

29. The method of claim 28, wherein analyzing at least one of both the received noise reference signal and the transmitted DSL data signal to identify one or more frequency bands in which to de-emphasize noise cancellation in the transmitted DSL data signal comprises measuring a correlation between a noise free representation of a DSL synchronization symbol repeatedly occurring in the transmitted DSL data signal and the received noise reference signal.

30. The method of claim 28, wherein analyzing the transmitted DSL data signal further comprises analyzing the transmitted DSL data signal to identify one or more frequency bands in which a Customer Premises Equipment (CPE) DSL modem to which the noise cancellation system is coupled is not to receive the transmitted DSL data signal.

31. The method of claim 28, wherein analyzing at least one of the received noise reference signal and the transmitted DSL data signal to identify one or more frequency bands in which to de-emphasize noise cancellation in the transmitted DSL data signal further comprises receiving configuration parameters from a network management station, the configuration parameters including frequency guidance information for use in identifying the one or more frequency bands, or including guidance to cancel specific types of noise present in the noise reference signal.

32. A noise cancellation system, comprising:
- a noise reference signal input port that receives a noise reference signal, the noise reference signal comprising energy from a Digital Subscriber Line (DSL) data signal transmitted on a DSL transmission line to which the nose cancellation system is coupled;
- a DSL data signal input port that receives the DSL data signal transmitted on the DSL transmission line to which the DSL data signal port is coupled;
- a processor programmed to perform logic according to a procedure to reduce noise in the transmitted DSL data signal, wherein the procedure includes:
  - a first step of a signal analysis block coupled to the DSL data signal input port and the noise reference signal input port to analyze at least one of the received noise reference signal and the transmitted DSL data signal to identify one or more frequency bands in which to de-emphasize noise cancellation in the transmitted DSL data signal; and
  - a second step of the noise cancellation logic coupled to the signal analysis block to cause the noise cancellation system to de-emphasize noise cancellation in the identified one or more frequency bands of the transmitted DSL data signal, responsive to the analysis:, wherein the processor is programmed to:
  acquire the DSL synchronization symbol based on the procedure; and
  determine whether a boundary of a next synchronization symbol is due to occur.

33. The system of claim 32, wherein the signal analysis block to analyze at least one of the received noise reference signal and the transmitted DSL data signal to identify one or more frequency bands in which to de-emphasize noise cancellation in the transmitted DSL data signal measures a correlation between a noise free representation of a DSL synchronization symbol repeatedly occurring in the transmitted DSL data signal and the received noise reference signal.

34. The system of claim 32, wherein the signal analysis block is further to analyze the transmitted DSL data signal to identify one or more frequency bands in which a Customer Premises Equipment (CPE) DSL modem to which the noise cancellation system is coupled is not to receive the transmitted DSL data signal.

35. The system of claim 32, wherein the signal analysis block further receives configuration parameters from a network management station, the configuration parameters including frequency guidance information for use in identifying the one or more frequency bands, or including guidance to cancel specific types of noise present in the noise reference signal.

* * * * *